United States Patent Office 3,484,291
Patented Dec. 16, 1969

3,484,291
GAS DEPRESSOR ADDITIVES FOR IRON ELECTRODES
Murdo James MacKenzie, Jr., Marlton, and Alvin J. Salkind, Princeton, N.J., assignors to ESB Incorporated, a corporation of Delaware
No Drawing. Filed Apr. 19, 1968, Ser. No. 722,562
Int. Cl. H01m 35/02, 43/04
U.S. Cl. 136—25                    7 Claims

ABSTRACT OF THE DISCLOSURE

In alkaline cells, for example of the nickel-iron type, additives to the iron electrode have been developed which substantially reduce gassing, thereby increasing the cell life. The basic element used as an additive agent in accordance with this invention is mucic acid wherein from about 0.1% to about 11% of this additive by weight of the active iron material is dry blended with the active iron material in forming the electrode. The stated proportions of the mucic acid may also be used in combination with such inorganic additives as antimony oxide, antimony sulfide, cadmium oxide and indium. Thiourea was also found to be a useful agent in this invention.

BACKGROUND OF THE INVENTION

In nickel-iron cells, hydrogen gas is observed to evolve in the area of the iron electrode during charging and while on open circuit. This gassing phenomenon is indicative of a current flow in the area of the iron electrode-electrolyte interface. This internal current flow is very undesirable since it operates to self-discharge the cell and cause the iron electrode to lose its electrical capacity. Therefore, by decreasing the rate of evolution of gas, the life of the nickel-iron cell is lengthened since the cell will not self-discharge as quickly as it does when hydrogen gas is evolved at higher rates.

Attempts to decrease the rate of hydrogen evolution in nickel-iron cells have involved mixing additive agents to the electrolyte solution or adding such agents directly to the active material of the iron electrode. Moulton, et al., did inhibit the gassing by adding certain agents, either individually or in combination to the iron active material as disclosed in U.S. Patent No. 2,644,022, "Alkaline Storage Battery With Negative Iron Exchange." However, as will appear in the disclosure herein, the additives used in the present invention are different from those used by Moulton, et al. and have resulted in greater and unexpected depression of the rate of hydrogen gas evolution.

SUMMARY OF THE INVENTION

It is therefore an object of this invention to provide additives to the iron electrode in a cell which will reduce the gassing occurring in the area of the electrode.

By so reducing the gassing the object of lengthening the overall cell life is obtained in addition to accomplishing the desired end of reducing the number of times necessary to charge the cell over a given period of time.

With respect to the additives used it is an arm of the invention to provide additives which are inexpensive, are easily incorporated into the present method of making iron electrodes, and render the cell capable of operating over a longer period of time.

Another purpose of the invention is to have organic and inorganic additives added alone or in combination to an iron electrode in a cell which reduce the contact of oxygen with the electrode, but which do not generate a permanent film that would interfere with charge or discharge of the cell.

Basically, this invention involves mixing mucic acid or similar materials in certain amounts with the active iron material. The mucic acid can be used as an additive individually or in combination with other agents as disclosed herein. Thiourea also can be used in accordance with the teaching of this invention.

With the use of these additives this invention seeks to achieve the objects of minimizing the gassing when the iron electrode is on charged stand in an electrolyte, to improve the charge acceptance of the electrode and to have a more significant end of charge voltage step.

While the mechanism by which this invention operates is not clearly understood, it is believed that the additives cause an increase in the activation energy level needed to initiate spontaneous local reactions in the area of the iron electrode-electrolyte interface. These local reactions result in a current flow which is readily observed as gassing and which operates to self-discharge the cell. By increasing the activation energy of the local reactions with the use of the additives, gassing is depressed and therefore the cell does not tend to be self-discharged as easily as without the additives. Another way of stating the theory of operation of these additives is to say that they increase the hydrogen overvoltage of the iron electrode since the overvoltage of an electrode is directly related to the activation energy referred to above.

DESCRIPTION OF THE PREFERRED EMBODIMENTS

The iron electrode that was used as the standard against which gassing rates and other characteristics were measured was the conventional Edison type electrode having active material made from pure iron. The additives were dry blended with the active iron material in a mill that rotated and tumbled the substances together for about 16 hours. Dry blending the additives with the active iron material is preferable since a concentration of the additives in the area of the electrode surface is achieved which is beneficial in depressing the gas evolution.

While other additives were tested mucic acid displayed the best promise to achieve the objects of the invention and it was shown to be very effective in depressing gas evolution both as a single additive agent and as one of two or three agents used in combination. Another additive that significantly decreases the gassing rate is thiourea.

In Example I there is shown the gassing rates of iron electrodes having mucic acid alone added in amounts ranging from about .1% to about 10% by weight of the active iron material. In Example II are shown the effects on the gassing rate when thiourea was added in the electrode. Example II also shows combinations of mucic acid with such inorganic materials as antimony sulfide, antimony pentoxide, antimony trioxide, cadmium oxide and indium wherein these combinations were added in amounts in toto ranging from about 0.5% to about 11% by weight of the active iron material.

In both Example I and Example II the miniature test cell, in which iron electrodes having various additives therein were tested, was a plastic container with three pairs of slots in the side walls to accept two positive nickel plates and the negative electrode holder. The negative electrode was in the form of a pressed pellet of iron containing about 2.5 grams of active material and was placed in the negative electrode holder. Gassing tests were made on various iron electrodes using different additives and utilizing an automatic cell cycling device to which the test cells were connected.

In line with one of the basic purposes of this invention, the test samples of iron electrodes having different additive agents therein were examined for gassing rates after being charged and left on stand in electrolytes which were either solution of 20% to 35% potassium hydroxide or mixed solutions of 20% to 35% potassium hydroxide and lithium hydroxide. Conventional iron electrodes were charged and were tested to obtain an average value for gassing rate measured after standing 300 hours in the electrolyte. This average is shown in Example I and was taken as the control value for measuring the effectiveness and desirability of various additives in decreasing the rate of gas evolution below the control value. Of particular interest were those iron electrodes tested which contained the additives listed in the two examples. Illustrated are the gassing rates at the 300 hour point of iron electrodes containing amounts of additive agents measured as percentages by weight of the active iron material.

It should be understood that it is not intended to limit this invention to the particular compositions shown since the amounts of the elements in each composition can be varied in certain ranges to accomplish substantially the purposes of this invention.

EXAMPLE I

Composition: Gassing rate — cc./hr. (300 hour point)
Conventional iron electrode _____ .33
Conventional iron electrode having added thereto:
  0.5% mucic acid _____ 0.10
  1% mucic acid _____ 0.08
  10% mucic acid _____ 0.03

EXAMPLE II

Composition: Gassing rate — cc./hr. (300 hour point)
Conventional iron electrode having added thereto:
  0.1% In, 0.3% mucic acid _____ 0.09
  0.1% In, 1% mucic acid _____ 0.06
  0.1% In (codeposited), 1% mucic acid__ 0.07
  0.1% In, 0.1% $Sb_2S_3$, 0.3% mucic acid __ 0.10
  0.1% In, 0.5% CdO, 1.3% mucic acid __ 0.08
  0.3% $Sb_2O_5$, 0.1% In, 0.3% mucic acid _ 0.02
  0.1% In, 0.1% $Sb_2O_5$, 0.3% mucic acid _ 0.01
  0.1% In, 0.1% $Sb_2O_3$, 0.3% mucic acid _ 0.009
  10% In, 0.1% $Sb_2O_5$, 0.3% mucic acid _ 0.001
  10% thiourea _____ .02

The above data clearly indicates that a signfiicant reduction in the rate of hydrogen gas evolution in the area of the negative iron electrode can be achieved by incorporating relatively inexpensive additive agents in small amounts in the iron active material.

Since gassing is indicative of a self-discharging of the cell it has been previously noted that to depress this phenomenon would result in increasing the life span of an alkaline cell having an iron electrode. Up to this point it has been demonstrated that the additives which are used in this invention suppress the gassing during charging and while the cell is on stand. A further increase in the operational life span of a cell such as a nickel-iron cell would result if the beneficial effect of supression of gas evolution rate produced by the additive agents were maintained after many cycles. Some of the additives did afford reasonable gassing protection after twenty-five cycles and the following additive agents were of particular interest in this regard:

(i) $Sb_2O_5$ (.1%), In (.1%), mucic acid (.3%)
(ii) $Sb_2O_3$ (.1%), In (.1%), mucic acid (.3%)

The percentage amounts of these additives are not to be considered as limitative of this invention but can be varied to achieve the desired results in accordance with the scope of this invention.

While much of the foregoing discussion has referred to nickel-iron cells it is not intended that this invention be viewed as limited in application to such cells. On the contrary, the additives disclosed herein and the scope of this invention clearly include the application of this invention to other types of cells using an iron electrode. Therefore, as example, this invention can advtangeously be used in air depolarized cells having an iron electrode therein. Other applications of this invention will be apparent to those skilled in the art.

What is claimed is:

1. An iron electrode comprising active iron and an additive agent selected from the group consisting of mucic acid and thiourea, said additive agent being present in amount ranging from about 0.1% to about 11% by weight of the active iron.

2. An iron electrode in accordance with claim 1 wherein mucic acid is the additive and is present in an amount ranging from about 0.1% to about 11% by weight of the active iron.

3. An iron electrode of claim 2 wherein the mucic acid is added to the active iron in combination with antimony pentoxide and indium and the combination of additives is present in an amount ranging from about 0.1% to about 11% by weight of the active iron.

4. An iron electrode of claim 2 wherein the mucic acid is added to the active iron in combination with antimony sulfide and indium and the combination of additives is present in an amount ranging from about 0.1% to about 11% by weight of the active iron.

5. An iron electrode of claim 2 wherein the mucic acid is added to the active iron in combination with antimony trioxide and indium and the combination of additives is present in an amount ranging from about 0.1% to about 11% by weight of the active iron.

6. An iron electrode of claim 2 wherein the mucic acid is added to the active iron in combination with cadmium oxide and indium and the combination of additives is present in an amount ranging from about 0.1% to about 11% by weight of the active iron.

7. An iron electrode in accordance with claim 1 wherein the additive is thiourea, said thiourea being present in an amount ranging from about 0.1% to about 11% by weight of the active iron.

References Cited

UNITED STATES PATENTS 3,345,212  10/1967  Schweitzer _____ 136—25

WINSTON A. DOUGLAS, Primary Examiner

C. F. LEFEVOUR, Assistant Examiner

U.S. Cl. X.R.
136—120